United States Patent [19]

Schmidt et al.

[11] Patent Number: 4,517,328
[45] Date of Patent: May 14, 1985

[54] MIXTURES OF SUBSTITUTED DIPHENYL ETHERS WITH AROMATIC POLYESTERS AND POLYESTER CARBONATES HAVING AN IMPROVED PROCESSIBILITY

[75] Inventors: Manfred Schmidt, Krefeld; Dietrich Rathmann, Leverkusen; Klaus Reinking, Wermelskirchen, all of Fed. Rep. of Germany

[73] Assignee: Bayer Aktiengesellschaft, Leverkusen, Fed. Rep. of Germany

[21] Appl. No.: 586,742

[22] Filed: Mar. 6, 1984

[30] Foreign Application Priority Data

Mar. 18, 1983 [DE] Fed. Rep. of Germany ....... 3309766

[51] Int. Cl.$^3$ ............................................. C08L 67/02
[52] U.S. Cl. ............................. 524/370; 524/601; 524/604; 524/605; 524/755; 524/757
[58] Field of Search ............... 524/370, 601, 604, 605, 524/755, 757

[56] References Cited

U.S. PATENT DOCUMENTS

| | | | |
|---|---|---|---|
| 2,605,244 | 7/1952 | Matlack et al. | 524/370 |
| 2,706,722 | 4/1955 | Caldwell | 524/370 |
| 2,762,788 | 9/1956 | Siggel et al. | 524/370 |
| 3,309,334 | 3/1967 | Holub | 524/370 |

Primary Examiner—Lester L. Lee
Attorney, Agent, or Firm—Connolly and Hutz

[57] ABSTRACT

Certain substituted diphenyl ethers improve the flowability of aromatic polyesters and polyester carbonates in the melt.

7 Claims, No Drawings

MIXTURES OF SUBSTITUTED DIPHENYL ETHERS WITH AROMATIC POLYESTERS AND POLYESTER CARBONATES HAVING AN IMPROVED PROCESSIBILITY

This invention relates to thermoplastic polyesters and polyester carbonates based on diphenols and iso- and/or terephthalic acid which contain certain substituted diphenyl ethers to improve the flowability in the melt.

Aromatic polyesters and polycarbonates are known (W. M. Eareckson, J. Polym. Sci. XL, 399–406 (1959); Andre Conix, "Thermoplastic Polyesters from Bisphenols", Ind. Eng. Chem., Vol. 51, No. 2, 147–150, February 1959; FR 1,177,517; U.S. Pat. No. 3,351,624; DE-AS No. 1,445,384; G. S. Kolesnikow et al, J. Polym. Sci. USSR, Vol. 9, 1967, P. 1705 to 1711; U.S. Pat. Nos. 2,030,331; 3,169,121; 3,409,704; DE-OS Nos. 2,714,544, and 2,758,030). Owing to their outstanding properties, they are widely used where high dimensional stability under heat and high strength are required.

Processing difficulties often arise in the case of aromatic polyesters and polyester carbonates on account of their high softening points and their relatively high viscosities in the melt. For this reason attempts are being made to further improve the flowability of the melt. Various measures have already been proposed for this purpose.

On the one hand, attempts have been made to solve the problem using combinations with ABS resins (published Japanese Patent Application No. 73/25 053), polyethylene terephthalate (DE-OS No. 2,333,017, published Japanese Patent Application No. 74/23 844, U.S. Pat. No. 3,946,091), polyethylene hydroxybenzoate (published Japanese Patent Application No. 75/5444), copolyesters consisting of ethylene glycol, terephthalic and p-hydroxybenzoic acid (published Japanese Patent Application No. 75/64 351), aliphatic or aromatic polyesters (published Japanese Patent Application No. 75/96 652) and polyamides (DE-OS No. 2,646,728). In these combinations not only were the dimensional stability under heat and the mechanical properties of the resulting compositions not completely satisfactory, but the transparency was also lost.

On the other hand, it has also been proposed to increase the flowability of aromatic polyesters by adding the following low molecular weight auxiliaries: trialkyl phosphates, diphenyl sulphoxide, esters of aromatic phosphonic acids and esters of aromatic carboxylic acids (published Japanese Patent Application Nos. 74/34 546, 74/86 433, 76/37 145 and 76/37 146). Owing to the high vapour pressure of these compounds, evaporation losses and even self-ignition of these flow auxiliaries must be reckoned with in view of the high processing temperatures of aromatic polyesters.

Thus, an object of the present invention is to provide aromatic polyesters and polyester carbonates with improved processibility using flow auxiliaries which do not have the above-mentioned disadvantages.

This invention provides mixtures, containing

A. from 95 to 99.5% by weight, based on the total of A and B, of aromatic polyesters and/or aromatic polyester carbonates based on diphenols and iso- and/or terephthalic acid, and B. from 0.5 to 5% by weight, based on the total of A and B, of at least one compound corresponding to the formula:

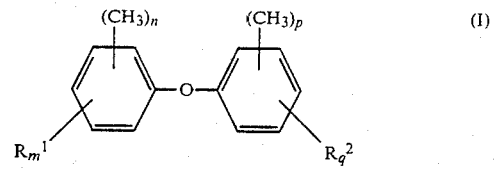

wherein
$R^1$, $R^2$ each independently represent an alkyl radical having from 2 to 24, preferably from 8 to 18, carbon atoms,
n,m,p,q each independently represent zero or an integer from 1 to 4, provided that the total of $m+q$ is at least 1, and the total of $n+m+p+q$ is at most 6.
m,q preferably represent 1 or 2 and
n,p preferably represent zero or 1.

This invention also provides a process for the production of these mixtures, according to which the components are combined, heated to a temperature which is from 10° to 80° C. above the softening point of component A, and homogenized under the effect of shearing forces.

Furthermore, the present invention also relates to the use of these mixtures for the production of mouldings and films.

The ratio of isophthalic acid radicals to terephthalic acid radicals in the aromatic polyesters and polyester carbonates A is preferably from 3:7 to 7:3, in particular from 4.5:5.5 to 5.5:4.5.

The aromatic polyesters and polyester carbonates A usually have relative viscosities of from 1.18 to 2.0, preferably from 1.2 to 1.5 (measured on a solution having a concentration of 0.5 g of substance in 100 ml of $CH_2Cl_2$ solution at 25° C.).

Diphenols which are preferred for the production of the aromatic polyesters and polyester carbonates A are compounds corresponding to the formula:

wherein Z represents a divalent, mono- or polynuclear aromatic radical having from 6 to 30 carbon atoms, and Z is arranged such that the two OH groups are each directly bound to a carbon atom of an aromatic system.

Diphenols which are particularly preferred are compounds corresponding to the formula:

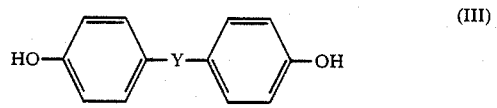

wherein Y represents a single bond, an alkylene or alkylidene radical having from 1 to 7 carbon atoms, a cycloalkylene or cycloalkidene radical having from 5 to 12 carbon atoms, —O—, —S—,

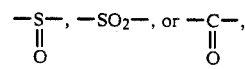

and derivatives thereof alkylated or halogenated in the nucleus, for example:
hydroquinone, resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones, and
α,α'-bis-(hydroxyphenyl)-diisopropylbenzenes
and derivatives thereof alkylated or halogenated in the nucleus, in particular, for example, bisphenol A, tetramethyl bisphenol A, 1,1-bis-(4-hydroxyphenyl)-isobutane, 1,1-bis-(4-hydroxyphenyl)-cyclohexane, 4,4'-dihydroxydiphenyl sulphide, 4,4'-dihydroxydiphenyl, 4,4'-dihydroxydiphenyl sulphone, and di- and tetra-halogenated derivatives thereof. Bisphenol A is particularly preferred. Any mixtures of the above-mentioned diphenols may also be used.

The following are preferably used as chain terminators for the aromatic polyesters and polyester carbonates A, the flowability of which may be improved according to the present invention: phenol, alkylphenols having $C_1$–$C_{12}$ alkyl groups, halogenated phenols, hydroxydiphenyl, naphthols, chlorocarbonic acid esters of those phenolic compounds and chlorides of aromatic monocarboxylic acids which may optionally be substituted by $C_1$–$C_{22}$ alkyl groups and halogen atoms, in quantities of from 0.1 to 10 mol % (in the case of phenols, based on diphenols, and in the case of acid chlorides, based on acid dichlorides).

Tri- or polyfunctional carboxylic acid chlorides or tri- and higher valent phenols may preferably be used in quantities of from 0.01 to 1 mol %, based on the dicarboxylic acid chlorides or diphenols which are used, as branching agents for the aromatic polyesters and polyester carbonates A, the flowability of which may be improved according to the present invention.

The aromatic polyester carbonates A may contain up to 90, preferably up to 45 mol % of carbonate groups, based on the total of ester and carbonate groups.

Preferred compounds which correspond to formula I are tri- and tetra-octyl-ditolylether and di-, tri- and tetra-stearyl ditolylether, the octyl radicals preferably being linear or corresponding to the formula:

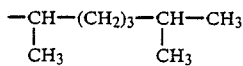

Substituted diphenyl ethers are suitable as are substituted ditolyl ethers.

The compounds corresponding to formula I may be produced, for example, by Friedel-Crafts alkylation of diphenyl ethers or ditolyl ethers.

The mixtures according to the present invention remain transparent as long as no more than 3% by weight of the compound I are added, and as long as the ratio of $C_{alkyl}$:$C_{aryl}$ in the compound I amounts to 3 at the most.

The compounds I which are to be used according to this invention may be worked homogeneously into the aromatic polyesters or polyestercarbonates, for example by co-extruding the compounds corresponding to formula I and the aromatic polyesters or polyester carbonates and by renewed granulation.

The compound I may also be added to the polyesters and polyester carbonates during production, for example before the solvents have evaporated.

Finally, it is also possible to roll the compound I onto the granulated material and to then directly process the product into mouldings.

The aromatic polyesters and polyester carbonates which are provided with compound I, according to the present invention, may contain stabilizers, mould-release agents, plasticizers and fillers, for example glass fibres, glass balls, asbestos and carbon fibres, kieselguhr, kaolin, rock flour and pigments.

They may be processed into mouldings in injection moulding machines or into semifinished products in extruders according to conventional processes, for example into lamp mountings, light switches, plugs and housings for electronic devices.

The percentages stated in the following Examples relate to the weight, unless otherwise indicated.

EXAMPLES

A. Preparation of the polyesters and polyester carbonates.

Polyester

The production of an aromatic polyester from bisphenol A and equimolar quantities of iso- and terephthalic acid chloride.

9.12 kg of bisphenol A, 24 g of sodium borohydride and 138 g of phenol (3.67 mol %, based on bisphenol A) were dissolved under a nitrogen atmosphere in 7.52 kg of 45% aqueous sodium hydroxide and 160 l of water. 148.4 g (1 mol %) of triphenylethyl phosphonium bromide were introduced into this solution, and 60 kg of dichloromethane and 48 kg of chlorobenzene were then added.

A solution of 4141.2 g of each of iso- and terephthalic acid dichloride in 12 l of dichloromethane was introduced into the intensively stirred two-phase mixture, with water cooling over a period of 15 minutes at an internal temperature of from 20° to 25° C. and at a pH of from 12 to 13.

After the addition, the mixture was then stirred for 15 minutes, the alkaline-aqueous phase was then separated, the organic phase initially washed with diluted phosphoric acid and then with water until the washing water had a conductivity of from 1 to $10^{-5}$ S/cm and then most of the dichloromethane was distilled off under normal pressure (sump temperature up to about 100° C.).

The remaining solution of the aromatic polyester in chlorobenzene which was still hot was freed from the chlorobenzene at 320° C. in a vacuum-double shaft extruder (screw diameter 32 mm) at about 0.014 bars up to a residual content of about 50 ppm, and the aromatic polyester was drawn off as a strand and granulated. The aromatic polyester had a relative viscosity $\eta_{rel}$ of 1.273, measured on a dichloromethane solution at 25° C. which contained 0.5 g of polyester per 100 ml of solution.

Polyester carbonate

The production of a polyester carbonate having a 50 mol % proportion of carboxylic ester, distributed statistically, from bisphenol A and iso- and terephthalic acid chloride in a molar ratio of 1:1.

2.736 kg of bisphenol A, 1.5 l of 45% aqueous sodium hydroxide, 8.4 g of sodium borohydride, 120 g of triethylbenzyl ammonium chloride, 36 l of water, 11 l of dichloromethane and 11 l of chlorobenzene were introduced under a nitrogen atmosphere into a steel reactor equipped with an intensive action stirrer, and the mixture was stirred until the bisphenol A had completely dissolved.

A solution of 609.09 g each of iso- and terphthalic acid dichloride and 46.3 g (4.1 mol %, based on bisphenol A) of phenol in 3 l of dichloromethane was then introduced into the intensively stirred two-phase mixture, with water cooling and over a period of 15 minutes, and the mixture was then stirred for 1 hour. The temperature of the reaction mixture did not exceed 22° C. The pH of the mixture was maintained at 12 to 13 by adding sodium hydroxide.

1 kg of phosgene was introduced while continuously stirring the mixture, and the temperature was again maintained at about 20° C. and the pH at from 12 to 13. After the phosgene had been introduced, 120 ml of a 4% aqueous solution of triethylamine were added and the mixture was then stirred for 1 hour.

After the aqueous-alkaline phase had been separated, the organic phase was washed first with diluted phosphoric acid and then with water until it was free of salt, and about 50% of the dichloromethane was distilled off under normal pressure. The remaining solution was diluted with 15 l of chlorobenzene and the distillation of the dichloromethane was continued until the sump temperature was about 80° C. The polyester carbonate was then freed from the chlorobenzene in a vacuum extruder at 320° C., drawn off as a strand and granulated. The polyester carbonate had a relative viscosity $\eta_{rel}$ of 1.256, measured as stated above for the polyester.

Production of moulding compositions and testing

Mixtures of the polyester granulates or polyester carbonate granulates and of the compounds I which are stated below were co-extruded in the quantities stated below (mass temperature: 320° C.). Flat spirals (width 8.5 mm, thickness 2 mm) were produced from the resulting granulates at 345° and 365° C. The length of the flat spirals is considered as a measurement of the flowability of the melt. In order to ensure that the improvement of the flowability is not to be substantially attributed to a reduction in the molecular weight, after the flat spirals had been injection moulded, relative viscosities thereof were determined in each case.

We claim:
1. A composition comprising a mixture of
   A. from 95 to 99.5% by weight, based on the total of A and B, of aromatic polyesters and/or aromatic polyester carbonates based on diphenols and iso- and/or terephthalic acid, and
   B. from 0.5 to 5% by weight, based on the total of A and B, of at least one compound corresponding to the formula:

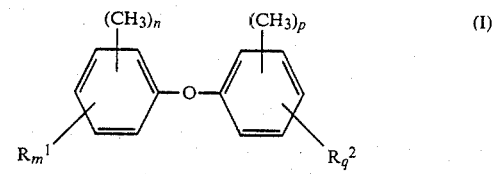

wherein
$R^1$, $R^2$ represent an alkyl radical having from 2 to 24 carbon atoms,
n,m,p,q represent zero or an integer from 1 to 4, provided that the total of
m+q is at least 1, and the total of
n+m+p+q is at most 6.

2. A composition according to claim 1, characterised in that
$R^1$, $R^2$ represent an alkyl radical having from 8 to 18 carbon atoms.

3. A composition according to claim 1, characterised in that
m, q represent 1 or 2, and
n, p represent zero or 1.

4. A process for the production of the composition according to claim 1, characterised in that the components A and B are combined, heated to a temperature which is from 10° to 80° C. above the softening point of component A, and are homogenised under the effect of shearing forces.

5. A composition according to claim 2, characterised in that
m, q represent 1 or 2, and
n, p represent zero or 1.

| Example | Resin | Quantity and type of compound I | Length [mm] of flat spiral | | η rel before and after injection moulding of the spirals (365° C.) |
|---|---|---|---|---|---|
| | | | 345° C. | 365° C. | |
| 1 | polyester | — | 130 | 170 | 1.272/1.269 |
| 2 | polyester | 1% tetra-n-octyl-ditolylether | 180 | 240 | 1.271/1.266 |
| 3 | polyester | 3% tetra-n-octyl-ditolylether | 240 | 310 | 1.271/1.264 |
| 4 | polyester | 2.5% isooctyl-ditolylether | 225 | 270 | 1.271/1.264 |
| 5 | polyester | 2.5% diisooctyl-ditolylether | 260 | 320 | 1.271/1.266 |
| 6 | polyester | 5% isooctyl-ditolylether | 250 | 310 | 1.269/1.264 |
| 7 | polyester | 2% tristearyl-ditolylether | 280 | 360 | 1.271/1.265 |
| 8 | polyester-carbonate | — | 230 | 280 | 1.254/1.253 |
| 9 | polyester-carbonate | 1% tetra-n-octyl-ditolylether | 310 | 390 | 1.253/1.253 |
| 10 | polyester-carbonate | 3% tetra-n-octyl-ditolylether | 340 | 440 | 1.251/1.251 |
| 11 | polyester-carbonate | 2% tristearyl-ditolylether | 410 | 480 | 1.252/1.252 |

All the samples 1–11 were transparent.

6. A process for the production of the composition according to claim 2, characterised in that the components A and B are combined, heated to a temperature which is from 10° to 80° C. above the softening point of component A, and are homogenised under the effect of shearing forces.

7. A process for the production of the composition according to claim 3, characterised in that the components A and B are combined, heated to a temperature which is from 10° to 80° C. above the softening point of component A, and are homogenised under the effect of shearing forces.

* * * * *